June 2, 1925.  1,539,936
J. H. CLARK
STEERING MECHANISM FOR VEHICLES
Filed Feb. 26, 1923
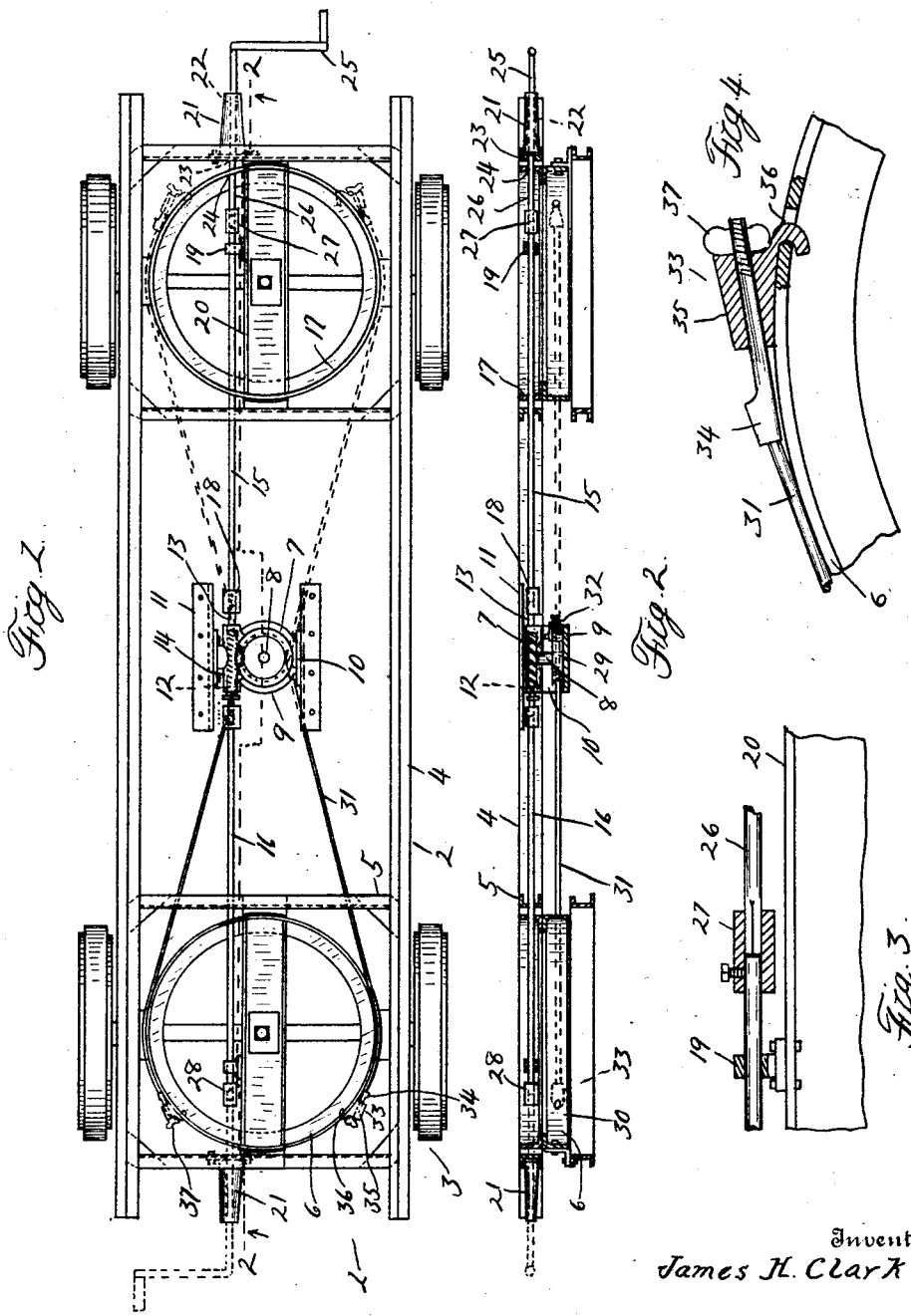
Inventor
James H. Clark Patented June 2, 1925.

1,539,936

UNITED STATES PATENT OFFICE.

JAMES H. CLARK, OF RIVER ROUGE, MICHIGAN.

STEERING MECHANISM FOR VEHICLES.

Application filed February 26, 1923. Serial No. 621,445.

*To all whom it may concern:*

Be it known that I, JAMES H. CLARK, a citizen of the United States of America, residing at River Rouge, in the county of Wayne and State of Michigan, have invented certain new and useful Improvements in Steering Mechanism for Vehicles, of which the following is a specification, reference being had therein to the accompanying drawings.

This invention relates to vehicles and refers particularly to the steering mechanism thereof.

An object of the invention is to provide simple and effective mechanism for steering the vehicle irrespective of the direction of travel.

Another object is to provide the vehicle with strong and durable steering mechanism which is adapted to be operated from different points of the vehicle according to the direction of travel.

With the above and other objects in view the invention consists in certain novel features of construction, combinations, and arrangements of parts as will be more fully described and particularly pointed out in the appended claims.

In the accompanying drawings:—

Figure 1 is a top plan view of a vehicle embodying my invention;

Figure 2 is a sectional view taken on line 2—2 of Figure 1;

Figures 3 and 4 are sectional detail views.

Referring now to the drawings in which like characters of reference designate corresponding parts throughout the several views, the numeral 1 designates a trailer having a horizontal frame 2 mounted upon a pair of wheeled trucks 3 which are preferably identical in construction so as to permit pulling and steering from either end of the vehicle. The frame 2, preferably comprises a pair of side bars 4 and a plurality of spaced parallel cross bars 5 which are arranged in pairs at the ends of the side bars. The trucks 3 are preferably connected to the frame by means of a pair of fifth wheels 6 which are preferably disposed between the cross bars 5.

The steering mechanism of the trailer is preferably mounted upon the frame 2 and is adapted to steer either truck of the trailer according to the direction of travel. In detail, a gear 7 is located about midway between the innermost cross bars 5 and is rotatably mounted upon a stub shaft 8 extending upwardly from the base 9 of a substantially U-shaped bracket 10 which is supported from the floor boards (not shown) of the vehicle by means of angle members 11. The gear 7 is adapted to be driven by a worm gear 12 mounted upon a relatively short shaft 13 which is journaled in a housing 14 upon the bracket 10. A pair of relatively long shafts 15 and 16 respectively are journaled in the inner-most sides of the upper sections 17 of the fifth wheels and also in the inner-most cross bars 5 and are detachably connected at their inner ends to the shaft 13 by means of suitable coupling members 18. The shafts 15 and 16 respectively terminate short of the outer sides of the upper sections 17 of the fifth wheels and are journaled in bracket bearings 19 removably secured to channel members 20 which are mounted upon the upper sections 17 of the fifth wheels. A pair of brackets 21 are removably secured to the outer cross bars of the frame and are provided with longitudinally extending openings 22 which are in alignment with openings 23 and 24 respectively in the outer cross bars of the frame and in the outer sides of the upper sections of the fifth wheels and which are also in alignment with the shafts 15 and 16 respectively. These shafts are adapted to be rotated alternately by a single crank 25 which has a relatively long shank 26 that can be easily and quickly inserted through or removed from the openings 22, 23, and 24 at either end of the frame and which may be placed into engagement with or discharged from either of the socket members 27 and 28 respectively detachably secured to the shafts 15 and 16 at the outer ends thereof.

A grooved wheel 29 is rigidly secured to the stub shaft 8 and is adapted to be alternately connected to the lower sections 30 of the fifth wheels by means of a removable cable 31. A screw 32 is supported upon the grooved wheel at one edge thereof and is adapted to engage the cable 31 to prevent the same from slipping. Suitable tensioning members 33 are provided to keep the cable taut and includes bolts 34 which extend through hooked mountings 35 detachably engaging openings 36 in the lower sections of the fifth wheels. Winged nuts 37 are threaded onto the bolts 34 and engage the mountings 35 to retain the cables at any tension desired.

In use, when it is desired to move the vehicle rearwardly the crank 25 may be applied to the socket member 27 at the forward end of the vehicle while the cable 31 may be applied to the lower section of the rear fifth wheel. Movement of the crank will rotate the shafts 15 and 16 and worm gear which will cause the gear 7 and grooved wheel to rotate and actuate the cable 31 with the result that the rear wheeled truck will turn in the desired direction.

When it is desired to steer the forward wheeled truck, the crank 25 may be removed from the socket member 27 so as to be applied to the socket member 28 at the rear end of the vehicle. Likewise, the cable 31 may be removed from the lower section of the rear fifth wheel so as to be applied to the lower section of the forward fifth wheel.

While it is believed that from the foregoing direction, the nature and advantages of the invention will be readily apparent, I desire to have it understood that I do not limit myself to what is herein shown and described and that such changes may be resorted to when desired as fall within the scope of what is claimed.

What I claim as my invention is:

1. The combination with a vehicle having a frame, a pair of wheeled trucks, fifth wheels having upper and lower sections respectively secured to said frame and trucks, and pivots connecting said upper and lower sections, of a supporting bracket between said fifth wheels, a wheel mounted on said bracket, a flexible member trained around the wheel on the bracket, blocks having hooks detachably engaging recesses in the lower section of one of said fifth wheels, bolts secured to the ends of said flexible member and extending through said blocks, nuts on said bolts for adjustably connecting said bolts to said blocks for varying the tension of said flexible member, and means for rotating said wheel for actuating said flexible member.

2. The combination with a vehicle having a frame, a wheeled truck, a fifth wheel having sections connected to said frame and truck, and a pivot connecting said sections, of a supporting bracket, a wheel mounted on said bracket, a cable trained around the wheel on the bracket and terminally connected to opposite sides of one section of said fifth wheel a shaft journaled on the bracket, a gear on the shaft, a gear connected to the grooved wheel and meshing with the gear aforesaid, a rod journaled in the frame and in the other section of said fifth wheel and connected to said shaft, and operating means at one end of said vehicle detachably connected to said rod.

3. The combination with a vehicle having a frame, a pair of wheeled trucks, fifth wheels having upper and lower sections respectively secured to said frame and trucks, and pivots connecting said upper and lower sections, of a supporting bracket between said fifth wheels, a vertical shaft journaled on the bracket, a grooved wheel secured to said shaft, a gear secured to said shaft, a cable trained around said grooved wheel, the ends of said cable being adapted to be alternately connected to the lower sections of said fifth wheels, a horizontal shaft journaled on the bracket, a gear on the vertical shaft meshing with the gear aforesaid, rods journaled in said frame and the upper sections of said fifth wheels and connected to opposite ends of said horizontal shaft, and operating means alternately engageable with said rods.

4. The combination with a vehicle having a frame, a pair of wheeled trucks, fifth wheels having upper and lower sections respectively secured to said frame and trucks, and pivots connecting said upper and lower sections, of a supporting bracket between said fifth wheels, a vertical shaft journaled on the bracket, a grooved wheel secured to said shaft, a gear secured to said shaft, a cable trained around said grooved wheel, the ends of said cable being adapted to be alternately connected to the lower sections of said fifth wheels, a horizontal shaft journaled on the bracket, a gear on the vertical shaft meshing with the gear aforesaid, rods journaled in said frame and the upper sections of said fifth wheels and connected to opposite ends of said horizontal shaft, and a crank adapted to be alternately connected to the outer ends of said rods for actuating the same.

In testimony whereof I affix my signature.

JAMES H. CLARK.